(No Model.)
W. T. JEBB.
METHOD OF MANUFACTURING MALT LIQUORS FROM STARCH.
No. 347,611. Patented Aug. 17, 1886.
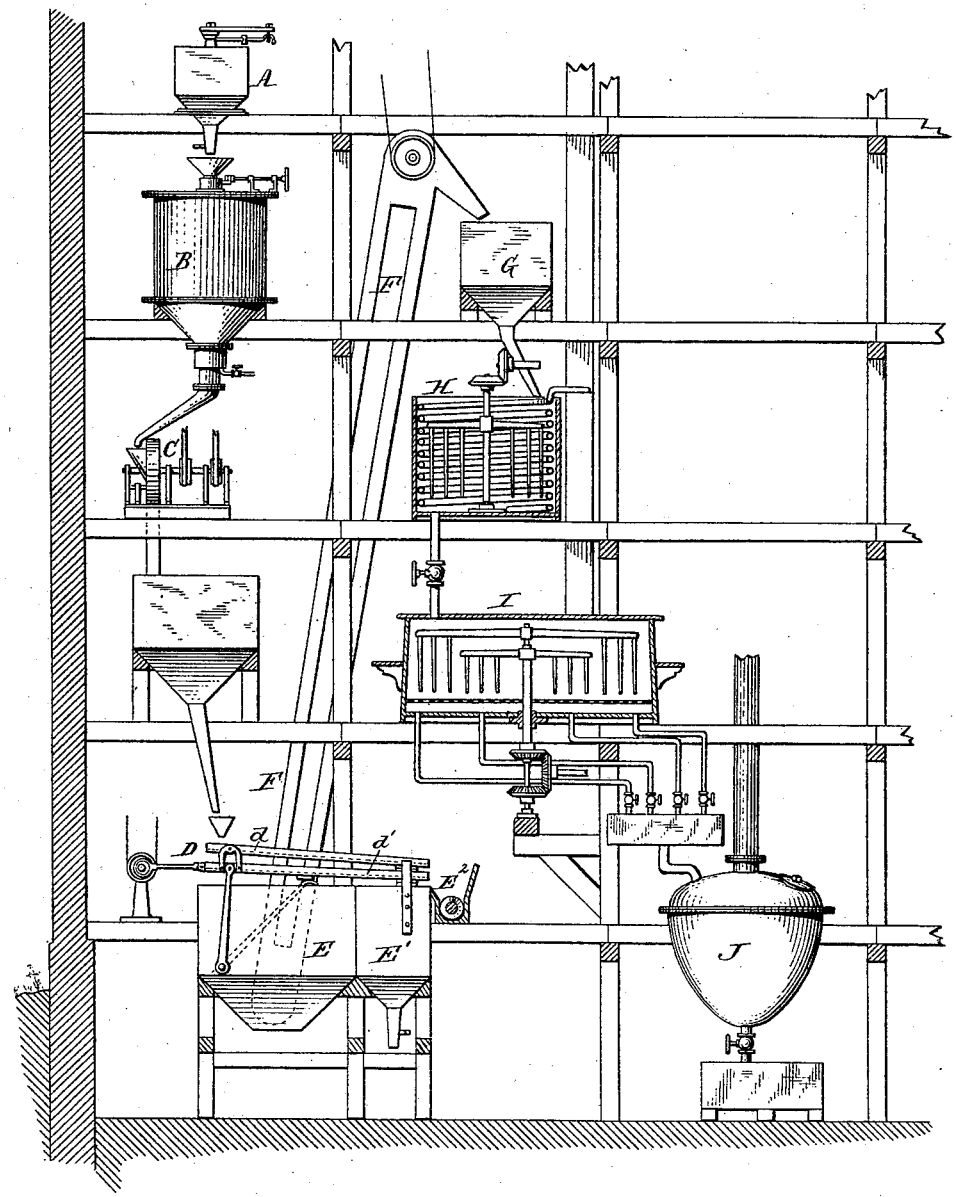

UNITED STATES PATENT OFFICE.

WILLIAM T. JEBB, OF BUFFALO, NEW YORK.

METHOD OF MANUFACTURING MALT LIQUORS FROM STARCH.

SPECIFICATION forming part of Letters Patent No. 347,611, dated August 17, 1886.

Application filed March 10, 1886. Serial No. 194,687. (No specimens.)

*To all whom it may concern:*

Be it known that I, WILLIAM T. JEBB, of the city of Buffalo, in the county of Erie and State of New York, have invented a new and useful Improvement in Methods of Manufacturing Malt Liquors from Starch, of which the following is a specification.

This invention relates to an improvement in the manufacture of malt liquors from the starch obtained from Indian corn or maize and malt. It is well known that barley contains besides starch a large percentage of nitrogenous or albuminous matter and wood fiber, the latter being principally found in the hulls, while the nitrogenous or albuminous matter is found principally between the hulls and the starchy bodies of the kernels. It is also well known that barley which is comparatively rich in starch and poor in hull and nitrogenous matter is preferred for malting and brewing.

In preparing from malt a wort suitable for the manufacture of beer or ale the object is to produce an extract containing all of the soluble ingredients of the malt; and in order to accomplish this object the starch and other valuable constituent parts of the grain are sought to be converted into soluble substances by the operations of malting and mashing. This effect is only partially produced in malting, because the germination must necessarily be arrested before all of the starch contained in the raw grain has been saccharified.

One of the objects of the operation of mashing is to convert the starch still contained in the malt into sugar; but this object is only partially realized, as is apparent from the deposit of dough or cake under the perforated draining-plates of the mash-tubs, which dough or cake consists of unconverted starch, preventing free straining of the wort, and causing a loss of material, unless it is worked over and converted by a subsequent operation. It is also well known that an addition of raw or unmalted grain to the malt in mashing has certain economic advantages; but these advantages are more than offset by the disadvantages resulting from the incorporation of gluten, fusel-oil, and bitter extractive matters in the wort, which objectionable substances are derived from the hulls, germs, and glutinous or nitrogenous portions of the raw grain. The practice of adding raw grain containing parts of the hulls, germs, &c., is therefore not only objectionable, because it injuriously affects the taste, color, and keeping qualities of the beer or ale, but is also objectionable from a sanitary point of view, as the product is less wholesome. Indian corn or maize is comparatively rich in starch, and therefore especially desirable as a raw material for the manufacture of beer or ale; but its nitrogenous or other objectionable ingredients found in the hulls, germs, and glutinous parts of the kernels render its successful use difficult.

The object of the present invention is to overcome these difficulties; and my invention consists to that end of the improvements which will be hereinafter fully set forth, and pointed out in the claims.

The accompanying drawing represents a plant of machinery by which my invention can be practiced.

A represents a weigh hopper or charger which receives the Indian corn or maize, and from which the same passes to the steep-tank B, in which the corn is steeped sufficiently to permit the hulls and germs to be detached from the starchy portions of the kernels. This steeping is preferably effected by supplying the steep-tank B with water having a temperature of about 140° Fahrenheit, and renewing the steep-water from time to time until the corn has reached the desired degree of softness. While I prefer to conduct this steeping operation in the above-described manner, it may be modified as the condition of the corn may require and the operator may deem expedient. For instance, the steeping may be effected by admitting to the steep-tank steam or watery vapor, instead of water. After the steeping has been completed the corn is preferably subjected to the drying operation described in Letters Patent No. 334,090, dated January 12, 1886. It is then conducted to the reducing-machine C, in which the corn is reduced in such manner that the starchy portions of the kernels or starch-meal can be separated from the hulls and germs or coarse offal by the subsequent sifting operation. I prefer for this purpose a machine which consists of several concentric rows of beaters revolving at a high speed in opposite directions within an inclosing-case, and whereby the grain is whipped or beaten. By the operation of this machine the hulls and their glutinous linings are opened and stripped or detached in large flakes from the inner starchy bodies of the kernels and from the germs, the starchy bodies being at the same time reduced to a meal and the germs either left unbroken or reduced to coarse fragments, so that the starch-meal can be easily separated from the germs and hulls by sifting. While I prefer to employ a whipping or beating machine for this reduction, any other suitable reducing-machine may be employed for the purpose—for instance, a disk-mill in which one of the disks has an eccentric movement with reference to the other, or a roller-mill; but none of these effect the desired reduction so completely and advantageously as the beating or whipping machine first mentioned.

D represents a screen-separator, whereby the starch-meal is separated from the fragments of hulls and germs, the starch-meal passing to a receiver, E, the germs to a receiver, E', and the hulls to a conveyer, E². The separator which I prefer to employ for this purpose consists of an upper coarse screen, d, and a lower fine screen, d', as described and shown in Letters Patent of the United States No. 334,090, dated January 12, 1886. The starch-meal passes through the coarse screen d and the finely-clothed head portion of the lower fine screen, d', into the receiver E, the germs pass through the upper screen, d, and the coarsely-clothed tail portion of the lower screen, d', into the receiver E', and the fragments of hulls tail off from both screens d d' into the conveyer E². Any other suitable separator by which the starch-meal is separated from the coarse offal may be employed, if desired.

F represents an elevator whereby the separated starch-meal is elevated from the receiver E to a receiver, G, in the upper part of the building.

H represents the developing-tank which receives the starch-meal from the receiver G, and in which the starch-meal is treated under the pressure of the atmosphere for developing the starch and preparing it for mashing. The tank H is charged with a suitable quantity of water, into which the starch-meal is fed under constant agitation, the tank being provided with a rotary stirrer or other suitable agitator for the purpose. The starch-meal mixed with the water is heated in this tank to a temperature, preferably, of from 200° to 210° Fahrenheit, and is kept at this temperature for about an hour. The starchy liquid is next cooled to a temperature of from 145° to 150° Fahrenheit, either by cold water or other cooling agent circulating through a coil or jacket with which the tank is provided, or by injecting such cooling agent into the liquid. The process of developing the starch proceeds rapidly and uniformly, as the starch-meal consists of starch granules which are of approximately uniform size, and which contain practically no fragments of hulls or germs which would interfere with the proper development of the starch.

I represents the mash-tub which receives the malt, and in which the latter is developed at a temperature of from 145° to 155° Fahrenheit. When the malt has been properly developed, the developed starch contained in the tank H is introduced into the mash-tub and thoroughly mixed with the malt. The mixture is then mashed for about an hour, or until a wort of the desired strength and quality is obtained.

While I prefer to conduct the various operations at the temperatures and during the periods herein specified, for the reason that they are known to produce satisfactory results, the operations may be modified both as to temperature and duration, as the condition of the material and the nature of the desired ultimate product may render expedient. The relative proportion of malt and starch used in the mash varies somewhat, and is to some extent controlled by the nature of the malt liquor which is desired to be manufactured, but fifty per cent. of starch and upward will produce a superior wort. The diastase of the malt readily converts the developed starch, so that the water used in mashing easily dissolves the saccharified material and forms an extract of wort of great strength or gravity. Upon draining the wort from the grains in the mash-tub the wort runs off freely and clear, as no unconverted starch or dough is deposited. The quantity of insoluble matter—such as hulls, &c.—introduced in the mash is reduced to a minimum, whereby the quantity of wort which is retained in the grains is correspondingly reduced.

J represents the kettle which receives the wort from the mash-tub and in which the wort is boiled, and the hops are added in any suitable or well-known manner. The wort is then drained through the hops in the hop-back, and cooled, fermented, and further treated in any usual or suitable manner to produce the desired ultimate product. The beer or ale produced in this manner is free from any objectionable taste or flavor and its keeping qualities are excellent, as all of the nitrogenous and oleaginous ingredients of the corn are eliminated before mashing. The yield of strong wort is very large, and the wort is produced at comparatively small expense.

The hulls, germs, and grains may be utilized as feed for cattle; or, if preferred, the germs can be pressed for extracting the oil.

It is obvious that the arrangement of the apparatus may be modified to suit the building in which it is placed.

I claim as my invention—

1. The herein-described method of producing a wort suitable for the manufacture of beer or ale, which consists in freeing the starchy portions of the kernels of Indian corn or maize from the hulls and germs, then developing the starch under the pressure of the atmosphere, and then mashing the developed starch together with malt and draining off the wort, substantially as set forth.

2. The herein-described method of producing a wort suitable for the manufacture of beer or ale, which consists in freeing the starchy portions of the kernels of Indian corn or maize from the hulls and germs by steeping, whipping, and sifting, then developing the starch under the pressure of the atmosphere, and then mashing the developed starch together with malt and draining off the wort, substantially as set forth.

3. The herein-described method of manufacturing beer or ale, which consists in freeing the starchy portions of the kernels of Indian corn or maize from the hulls and germs, then developing the starch under the pressure of the atmosphere, then mashing the developed starch together with malt, then draining off the wort, boiling the wort, adding the hops, draining off the liquid, and cooling and fermenting the same, substantially as set forth.

4. The herein-described method of manufacturing beer or ale, which consists in freeing the starchy portions of the kernels of Indian corn or maize from the hulls and germs by steeping, whipping, and sifting, then developing the starch under the pressure of the atmosphere, then mashing the developed starch together with malt, then draining off the wort, boiling the wort, adding the hops, draining off the liquid, and cooling and fermenting the same, substantially as set forth.

Witness my hand this 5th day of March, 1886.

WILLIAM T. JEBB.

Witnesses:
E. D. GRANT,
U. D. PULLEN.